July 12, 1960     E. M. GLUHAREFF     2,944,610
ROTOR BLADE COUNTERBALANCE MEANS
Original Filed July 28, 1951     2 Sheets-Sheet 1
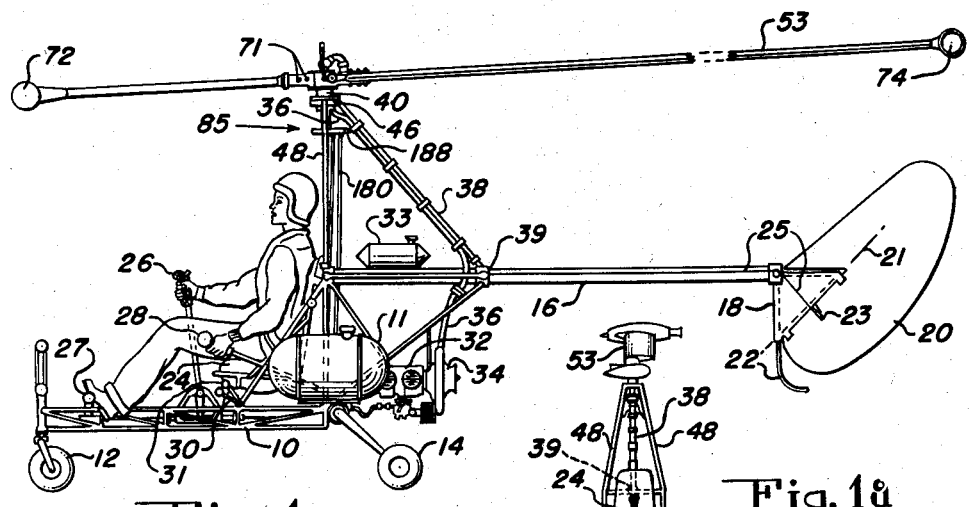
Fig. 1     Fig. 1a
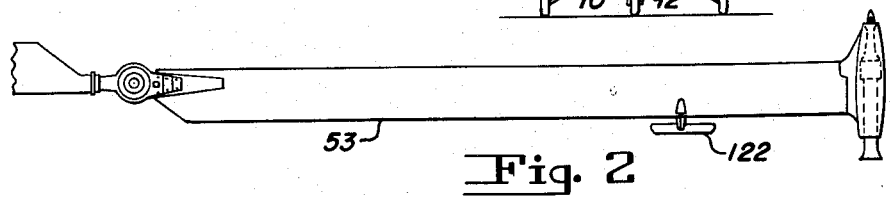
Fig. 2
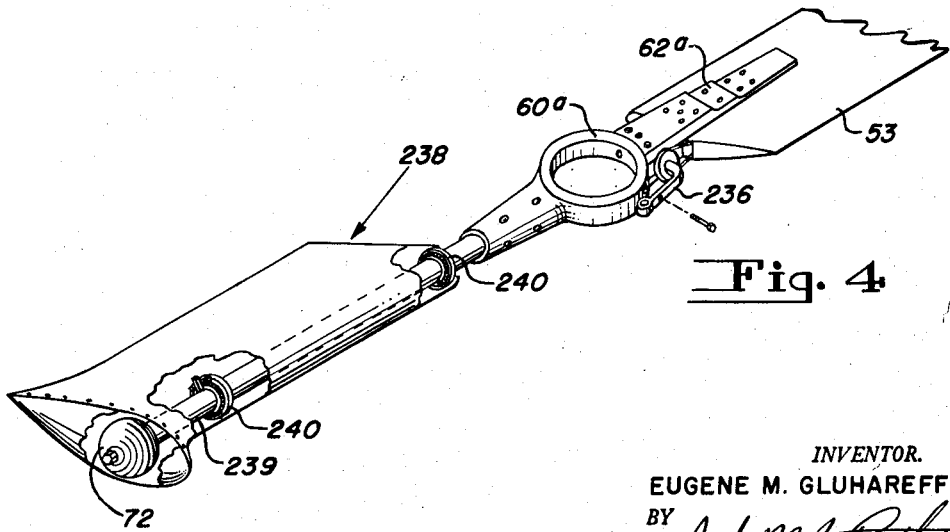
Fig. 4
INVENTOR.
EUGENE M. GLUHAREFF
BY
AGENT July 12, 1960  E. M. GLUHAREFF  2,944,610
ROTOR BLADE COUNTERBALANCE MEANS
Original Filed July 28, 1951  2 Sheets-Sheet 2

INVENTOR.
EUGENE M. GLUHAREFF
BY
AGENT

# United States Patent Office 2,944,610
Patented July 12, 1960

2,944,610
ROTOR BLADE COUNTERBALANCE MEANS

Eugene M. Gluhareff, Manhattan Beach, Calif., assignor to United Aircraft Corporation, East Hartford, Conn., a corporation of Delaware Original application July 28, 1951, Ser. No. 239,095. Divided and this application Aug. 24, 1956, Ser. No. 606,535

1 Claim. (Cl. 170—160.27)

This invention relates to rotary wing aircraft and particularly to aircraft of this type in which the rotor includes a counterweight having a movable faired member.

This application is a division of application Serial No. 239,095, filed July 28, 1951, to Eugene M. Gluhareff.

It is an object of the present invention to provide a single blade rotor for a helicopter having a feathering counterweight which is always at the position of minimum drag regardless of the blade angle of the lifting blade.

Another object of the invention is generally to improve the construction and operation of jet driven helicopters.

These and other objects and advantages of the present invention will be obvious or will be pointed out in the following detailed description of an illustrative embodiment of the invention shown in the accompanying drawings.

In these drawings:

Fig. 1 is a side elevation of a single blade, jet driven helicopter embodying the invention.

Fig. 1a is a detail view from the front showing the support for the rotor.

Fig. 2 is a top plan view of the blade showing the control tab on its trailing edge located just inboard of the jet motor.

Fig. 4 is a detailed perspective view of a streamlined self-feathering counterweight fairing for the lift portion of the blade shown in Fig. 2 which enables the hub to act as a pitch changing pivot for the blade without introducing the inertia of the counterweight.

Figure 3:
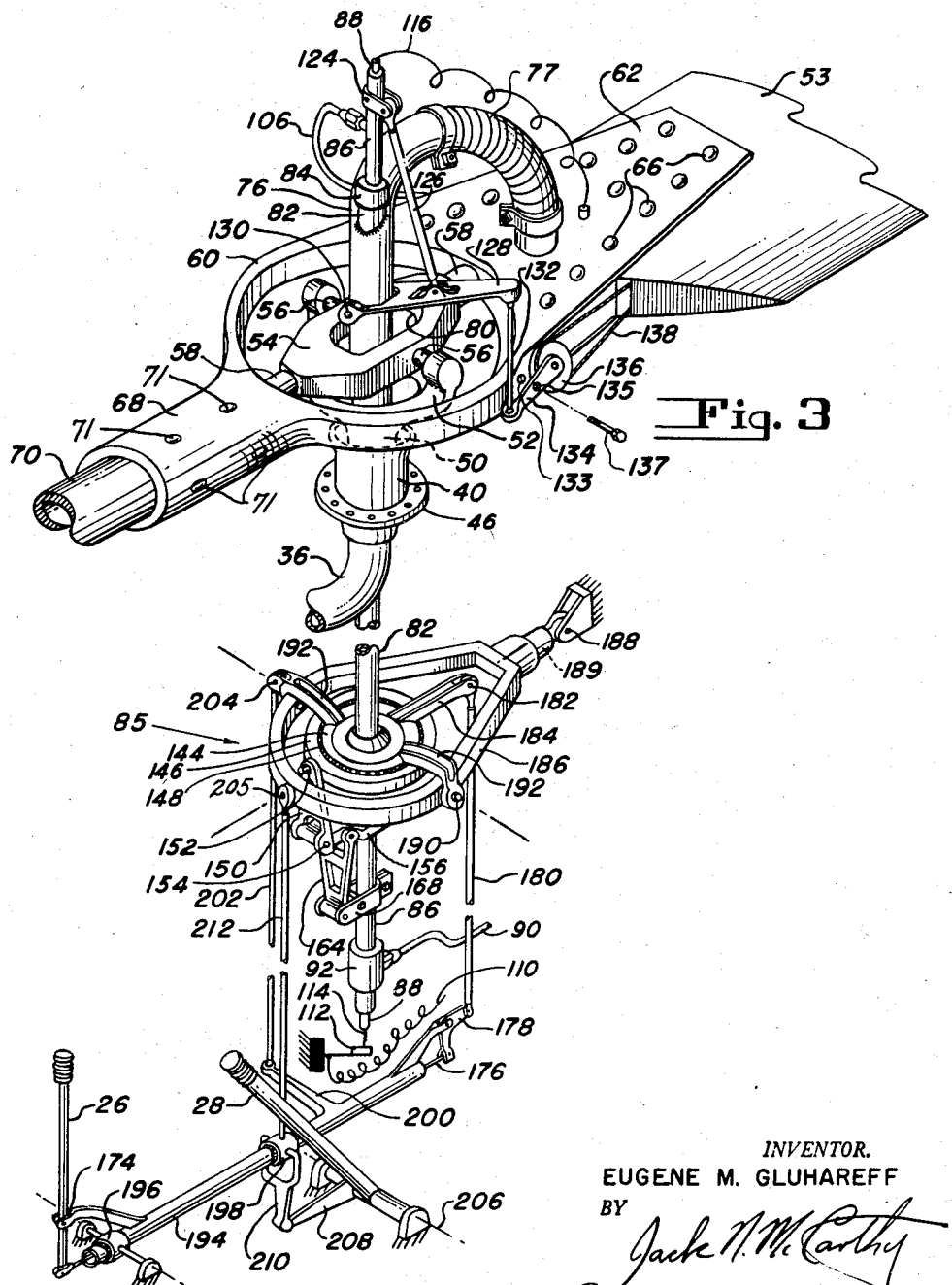
Fig. 3 is a view illustrating the rotor hub controls for the helicopter of Fig. 1 including the lower azimuthal ring, parts being broken away to facilitate illustration.

As shown in Fig. 1, the helicopter embodying this invention includes a structural platform 10 which is supported when the helicopter is on the ground by tricycle landing gear including the nose wheel 12 and the laterally spaced main landing gear wheels 14. The platform 10 also carries a skeleton framework in the form of a truss for supporting a tail piece 16 terminating in a vertical plate 18 on which a rudder 20 is pivotally mounted on inclined axis 21. By control horns 23 and cables 25 (of which only the left hand connection is shown) the rudder 20 is connected to the rudder pedals 27 in a conventional manner. The tail piece and the plate 18 at its extremity also support a tail skid 22 which protects the rudder in the event of a tail down landing.

The platform 10 supports a seat 24 and has pivotally mounted thereon the cyclic pitch control stick 26 and the collective pitch control stick 28 as well as the control lever 30 which operates a needle valve controlling the flow of fuel to the jet motor. An air compressor unit is mounted behind the pilot's seat. This unit includes an internal combustion engine 32 which is supplied with fuel from a tank 33 and drives an air compressor 34. Lever 31 is connected to the throttle of engine 32 and also controls a relief valve (not shown) on the pressure side of the compressor which is opened when the motor is idling. The compressed air from the compressor 34 is carried by a suitable duct 36 to the rotor head, this duct being secured to frame member 38 (Fig. 1) which extends from a ring member 39 secured to the tail piece 16 to the rotor head.

The rotor head (Fig. 3) is rotatably mounted in a flanged member 40 by suitable vertically spaced bearings, the flange 46 of said member being fixedly supported by the oblique frame member 38 and upright frame members 48, best shown in Fig. 1a. Flanged member 40 supports a tubular member 50 formed at its upper end in the shape of a yoke 52 which pivotally supports the hub 54 of the blade 53 on suitable bearings for flapping movement of the blade about the pivot pins 56 which extend laterally from opposite sides of the hub. The blade is supported on the hub 54 for pitch changing movement about the longitudinal axis of the blade on pins 58 carried by the hub and journalled in suitable bearings in the blade ring 60. Pins 58 in conjunction with pins 56 provide a gimbal mount for the blade, permitting a substantial amount of universal movement on its support 52 as shown most clearly in Fig. 3. Integral with ring 60 are a pair of upper and lower blade root attaching plates 62 between which the blade preferably of hollow metal construction, is secured by rivets 66. The ring 60 also has integral therewith a hub 68 which is diametrically opposite the blade in which a tube 70 is fixed by fastenings 71. Tube 70 forms a support for the counterweight 72 which balances the blade including the jet motor 74 carried by the outboard end of the blade.

The stationary section 36 of the compressed air duct terminates just beneath the lower end of sleeve 50 of the rotor head where it forms a seat for a rotatable section 76 of the compressed air duct which rotates with the rotor head, the lower end of duct 76 being suitably sealed in the stationary duct 36. The duct 76 is connected by means of a flexible conduit 77 with a conduit which is connected to an air nozzle ahead of jet motor 74.

The air duct 76 extends through a central aperture 80 in the hub 54 with sufficient clearance on all sides to permit both flapping movement and pitch changing movement of the blade, as will be evident from Fig. 3, and these movements of the blade relative to the duct 76 are permitted by the flexible connection 77 previously described which is connected to the hollow interior of the blade. The duct 76 also has welded thereto a coaxial inner tube 82 which has a cap 84 at its upper end and extends downwardly through the upper end of the stationary duct 36 to a point below the swashplate mechanism, generally indicated at 85. Tube 82 has within and concentric with it a fuel pipe 86 and an innermost ignition pipe 88. Fuel is introduced into the fuel pipe 86 through a flexible hose 90 which terminates in a stationary housing, or manifold, 92 surrounding a perforated portion of the rotating fuel pipe 86, this housing being located between upper and lower flanges on the fuel pipe and having upper and lower annular seals which engage pipe 86. The pipe 86 is closed at its upper end by a seal between it and the ignition pipe 88. A flexible fuel conduit 106 communicates with the upper end of the pipe 86 and conducts the fuel through the hollow blade to a metering device or spray nozzle on the jet motor 74. The fuel for the jet is carried in tanks 11 on either side of the fuselage. Air pressure from the compressor unit may be introduced into these tanks to provide the initial pressure to start the jet rotor after which centrifugal force on the fuel in the blade may be sufficient to maintain full operation.

Ignition for the jet motor is supplied from a suitable high tension magneto through a lead 110 to a stationary contact 112 which is engaged by a rotating brush shown diagrammatically at 114. The high tension conductor 116 from brush 114 extends through the ignition pipe 88 and through the blade to a spark plug on the jet motor.

The fuel pipe 86 is axially slidable through the cap 84, the latter of which is provided with a sealing ring to form a fluid type connection between pipe 86 and tube 82. The reciprocating movements of pipe 86 are used to move the tab 122 (Fig. 2) located on the trailing edge of the blade just inboard of the jet motor to cause the blade to change pitch. To this end a U-shaped clamp 124 on pipe 86 is connected by a rod 126 to an arm 128 pivoted on the air duct 76 at 130. The free end of arm 128 has the upper end of a rod 132 universally connected thereto and this rod is universally connected at its lower end to an arm 134 fixed at its other end to a pulley 136 about which the cable 138 operates to move the tab 122 in a well-known manner. By securing arm 134 to the ring 60 by a bolt 137 through holes 133 and 135 the blade pitch may be directly connected to the swashplate.

The swashplate generally indicated at 85 is universally supported on tube 82 which, it will be recalled, is rotatable with the rotor head but is axially fixed by being welded to the compressed air duct 76 at the upper end of the latter. The axially stationary tube 82 has a non-rotatable universal hub mounted for sliding movement thereon by a suitable bearing. The inner non-rotatable ring 144 of the swashplate carries a socket embracing the hub and is thus universally moveable and also axially slidable relative to tube 82. The outer rotatable ring 146 of the swashplate is supported on the inner ring 144 by a bearing 148. This outer ring has the upper end of a vertical link 150 pivotally connected thereto at 152. The other and lower bifurcated end of link 150 is pivotally connected at 154 with a horizontal lever 156 which is in turn pivoted on the opposite side of tube 82 to a clamp extending outwardly from axially fixed tube 82. A link 164 is attached intermediate the lever 156. The lower end of link 164 is pivotally connected to a clamping member 168 which is rigidly secured to tube 86.

The swashplate comprising the inner ring 144 and outer ring 146 is moved axially along the tube 82 bodily and is tilted by the total pitch stick 28 and the cyclic pitch stick 26 respectively by means of more or less usual push-pull rods which will now be described. When the cyclic pitch control stick 26 is moved fore and aft about its pivot 174 a rod 176 pivotally connected to the lower end of stick 26 reciprocates a bellcrank 178 which in turn reciprocates a vertical rod 180 pivotally connected at 182 to an arm 184 rigidly connected to the inner ring 144 of the swashplate. The swashplate is supported by a ring 186 pivotally mounted on fixed structure of the helicopter at 188. The ring 186 is also free to tilt laterally on bearing 189 which, in conjunction with pivot 188, provides a universal support for the ring. The ring 186 provides diagonally opposite pivotal supports 190 for the two arms 192 carried by the inner swashplate ring 144 about which the swashplate tilts during reciprocation of rod 180.

Lateral movement of the stick 26 causes the tube 194 to rotate in its bearings 196 and 198 to cause the arm 200 thereon to reciprocate rod 202 which is connected to the stationary ring 186 at a point 204, 90° removed from the arm 184. As rod 202 reciprocates, ring 186 and the swashplate tilt bodily about bearing 189 and pivot 205 at the upper end of rod 212. It will be evident that when the total stick lever 28 is moved about its axis 206 the arm 208 rigid therewith will act through the link 210 to move the bearing 198 and with it the rods 212, 202 and 180 to effect bodily movement of the swashplate on the tube 82.

In Fig. 4 a somewhat modified rotor head has been shown in which the blade 53 is secured between stepped plates 62a formed integral with a ring 60a which may be mounted on the hub 54 and the yoke 52 as shown in Fig. 3. In this modified rotor head the pitch of the blade is controlled by arm 236 by suitable pitch changing mechanism which may be the same mechanism as that shown in Fig. 3 for operating the arm 134. The blade 53 is counterbalanced by weight 72 as in the previous construction which counterweight is enclosed by a self-feathering fairing generally indicated at 238. The fairing is supported on the spar 239 for the counterweight by anti-friction bearings 240 so that the fairing is always free to rotate about the spar axis and align itself with the relative wind. One of the advantages of this construction is that the blade is freed from the inertia effects of the fairing in its blade pitch changing movements. Further, the counterweight side of the rotor should not only have the least possible drag and a constant drag versus angle of blade incidence but should have a neutral pitching moment around the feathering axis which is obtained when the weight is in the form of a sphere or disc. If the fairing 238 were rigidly connected to the integral blade spar and hub, it would assume various angles of incidence as the blade changed its pitch, producing a variable drag and a variable pitching moment.

While a preferred embodiment of the invention has been disclosed herein in detail, it will be evident that various changes in the construction and arrangement of the parts may be made without departing from the scope of the invention.

I claim:

In a helicopter rotor, a shaft, a ring, said ring being mounted in relation to said shaft for universal movement, a first elongated member of airfoil section extending outwardly from said ring, a second elongated member of airfoil section extending outwardly from said ring at a point diametrically opposed from said first elongated member, means for fixing said first elongated member to said ring for integral movement therewith, means for mounting said second elongated member to said ring for rotation, said last named means including a spar extending outwardly from said ring at a point diametrically opposed from said first elongated member, means for fixing said spar to said ring for integral movement therewith, said spar extending into said second elongated member, bearing means located between said spar and said second elongated member permitting free relative motion therebetween, a counterweight located at the free end of said spar enclosed by said second elongated member, pitch changing means operatively connected to said first elongated member for changing the pitch of said first member and rotating said ring and spar, said spar rotating within said second member without affecting the pitch of said second member.

References Cited in the file of this patent

UNITED STATES PATENTS

| | | |
|---|---|---|
| 1,104,254 | Eddelbutted-Reimers | July 21, 1914 |
| 2,247,034 | Pitcairn | June 24, 1941 |
| 2,693,241 | Ranson | Nov. 2, 1954 |
| 2,742,095 | Pitcairn et al. | Apr. 17, 1956 |